May 24, 1927.　　　　N. A. McMAHON　　　　1,630,198
STRAINER
Filed April 26, 1926　　　2 Sheets-Sheet 1

Nathan Arthur McMahon
INVENTOR

BY Victor J. Evans
ATTORNEY

WITNESS:

May 24, 1927.  
N. A. McMAHON  
STRAINER  
Filed April 26, 1926  
1,630,198  
2 Sheets-Sheet 2

Nathan Arthur McMahon
INVENTOR
BY Victor J. Evans
ATTORNEY

WITNESS:

Patented May 24, 1927.

1,630,198

UNITED STATES PATENT OFFICE.

NATHAN ARTHUR McMAHON, OF DURAND, WISCONSIN.

STRAINER.

Application filed April 26, 1926. Serial No. 104,815.

This invention relates to a strainer for use on milk separators, the general object of the invention being to provide means for straining the milk a number of times as it is being poured into the tank of the separator so that the impurities will be removed from the milk before it passes through the separator.

Another object of the invention is to so arrange the screens that they are readily accessible so that they can be easily cleaned.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
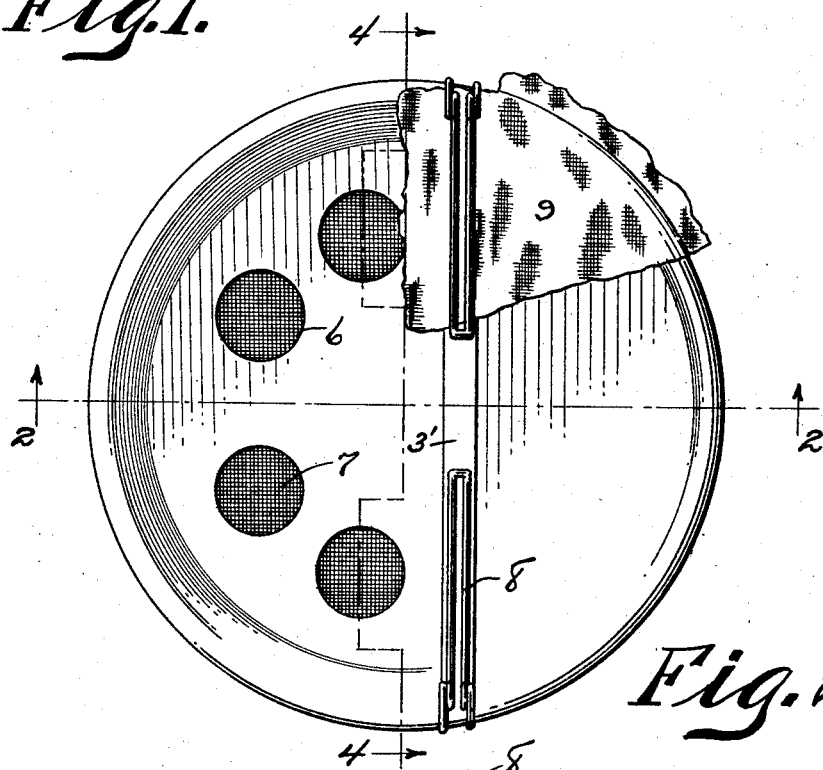
Figure 1 is a plan view of the device, with parts broken away.
Figure 2:
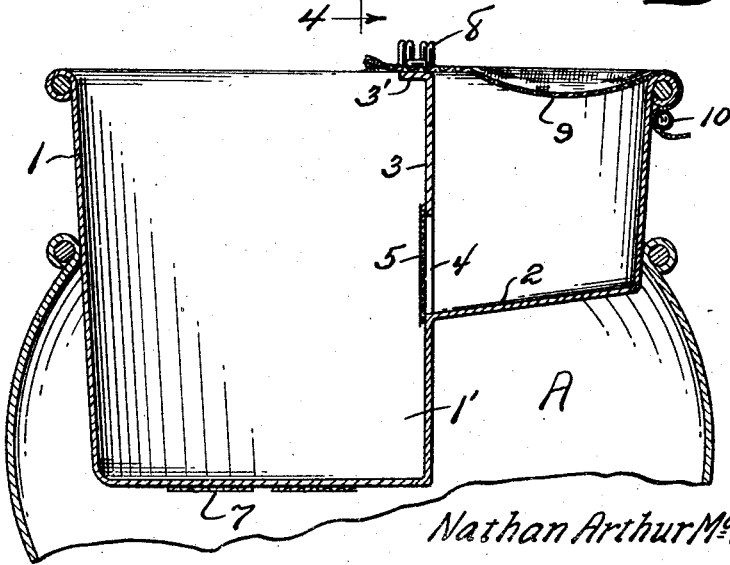
Figure 2 is a section on line 2—2 of Figure 1.
Figure 3:
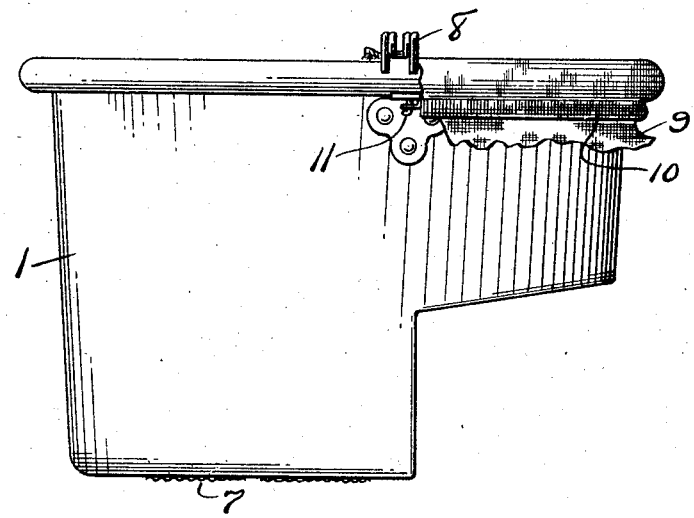
Figure 3 is a side view of the device itself.
Figure 4:
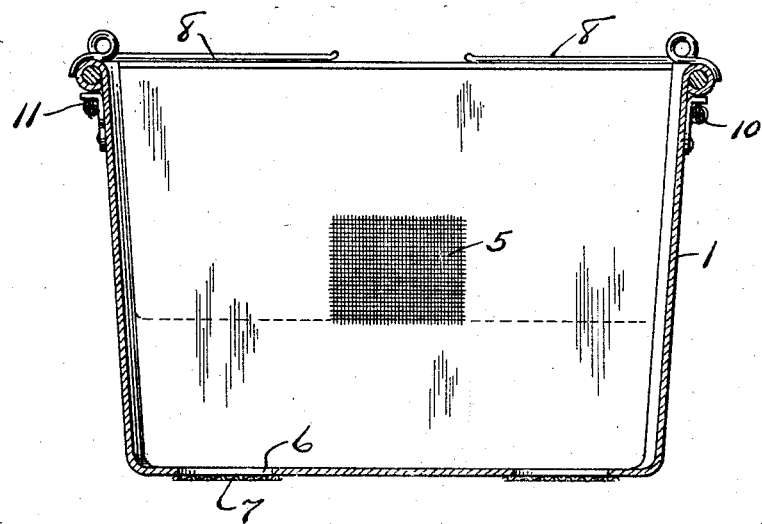
Figure 4 is a section on line 4—4 of Figure 1.

In these views, 1 indicates the receptacle of the device which is of slightly tapering formation so that it may be seated in the mouth of the supply tank A of a separator, as shown in Figure 2. One portion of the receptacle is provided with an extension 1' at its bottom so that this part of the receptacle is of greater depth than the other part and this other part has a sloping bottom 2 which causes the milk to drain into the extension 1'. A partition 3 is arranged in the receptacle and divides the part of less depth from that with the greater depth. An opening 4 is made in the bottom of the partition which is covered by a strip 5 of screening material. Openings 6 are formed in the bottom of the extension and these openings are each covered by a strip 7 of screening material. These screens may be soldered in place so they can be easily renewed when worn and they can be easily cleaned owing to their arrangement and the large size of the compartments in which they are placed.

Spring arms 8 are fastened to the sides of the device and are arranged over a flat upper part 3' of the partition 3 and are designed to removably hold a sheet 9 of filtering material over the small chamber, a spring 10 or other flexible member holding another portion of the sheet over the bead of the receptacle, this spring having its ends held by hooks 11 on the receptacle so that the sheet can be easily removed from over the small chamber whenever desired.

From the foregoing, it will be seen that the milk to be separated is poured into the small chamber through the filtering sheet 13 and the milk entering the chamber will run down the sloping bottom of the same through the screen 5 into the large chamber and it will pass from said large chamber through the screens 7 into the tank A of the separator. Thus the milk is strained three times before passing into the tank of the separator.

By making the receptacle tapering, the device will fit in different sizes of separator tanks and the receptacle may be provided with a bail so that it can be easily handled.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A strainer of the class described comprising a receptacle having one part of greater depth than the other, a partition dividing the two parts and having an opening at its bottom for permitting liquid to pass from the part of less depth to the other part, a screen covering the said opening and the bottom of the deep part having an opening and a screen covering the same.

2. A strainer of the class described comprising a receptacle having one part of greater depth than the other, a partition dividing the two parts and having an opening at its bottom for permitting liquid to pass from the part of less depth to the other part, a screen covering the said opening, the bottom of the deep part having an opening, a screen covering the same, a sheet of straining material arranged over the shallow part, spring members for holding a portion of the said sheet on the partition and a spring member extending partly around the exterior of the receptacle for clamping another portion of the sheet in place.

3. A strainer comprising a tapered receptacle, a partition dividing the same into two chambers, an extension on the bottom of a portion of the receptacle making one chamber of greater depth than the other, said partition having an opening therein, a screen covering said opening, the extension having an opening therein, a removable screen carrying frame in said opening, and means for detachably holding a sheet of straining material over the top of the small chamber.

In testimony whereof I affix my signature.

NATHAN A. McMAHON.